United States Patent [19]

Koizumi et al.

[11] 4,137,898
[45] Feb. 6, 1979

[54] AIR TYPE SOLAR HEATING SYSTEM

[75] Inventors: Hisao Koizumi, Zushi; Yoshinosuke Kawada, Yokohama; Hiroaki Murasaki, Zushi; Satoshi Hisaoka, Yokohama, all of Japan

[73] Assignee: Tokyo Shibaura Electric Co., Ltd., Kawasaki, Japan

[21] Appl. No.: 753,823

[22] Filed: Dec. 23, 1976

[30] Foreign Application Priority Data

Dec. 26, 1975 [JP] Japan .................. 51-154771
Dec. 26, 1975 [JP] Japan .................. 51-154772
Dec. 26, 1975 [JP] Japan .................. 51-158664

[51] Int. Cl.² .......................... F24J 3/02; F24D 5/00
[52] U.S. Cl. .................... 126/270; 126/400; 237/1 A
[58] Field of Search ............ 126/270, 271, 400; 237/1 A; 62/238; 236/13

[56] References Cited

U.S. PATENT DOCUMENTS

| 2,680,565 | 6/1954 | Lof | 237/1 A |
|---|---|---|---|
| 3,931,806 | 1/1976 | Hayes | 126/400 |
| 3,976,123 | 8/1976 | Davies | 62/238 |
| 3,994,276 | 11/1976 | Pulver | 126/270 |
| 3,996,759 | 12/1976 | Meckler | 237/1 A |
| 3,997,108 | 12/1976 | Mason | 237/1 A |
| 4,007,776 | 2/1977 | Alkasab | 237/1 A X |
| 4,010,731 | 3/1977 | Harrison | 126/400 |
| 4,019,494 | 4/1977 | Safdari | 126/270 |
| 4,029,258 | 6/1977 | Groth | 126/270 X |

Primary Examiner—William F. O'Dea
Assistant Examiner—Larry Jones
Attorney, Agent, or Firm—Oblon, Fisher, Spivak, McClelland & Maier

[57] ABSTRACT

An air type heating system includes a heat collector connected to heat air streams running through the collector by solar heat and a heat storage member containing heat-storage material for absorbing heat of the air heated by the heat collector and progressively accumulating heat, starting with one air port. A room is heated by the heated air supplied from the heat collector and/or the heat storage member through the one air part thereof.

12 Claims, 8 Drawing Figures

AIR TYPE SOLAR HEATING SYSTEM

BACKGROUND OF THE INVENTION

1. Field of the Invention

This invention relates to a solar heat-utilizing system, and more particularly to a system capable of continuous room heating and general drying which is adapted to collect solar heat by a hot air collector with air used as a heat-transferring medium and normally preserve part of the solar heat thus collected to release it at night time or during the time in which sunshine is not obtained for room heating or general drying.

2. Description of the Prior Art

A general air type solar heating system typically includes the type which collects solar heat by a heat collector for room heating with air or water applied as a heat-transferring medium.

Among the above-mentioned room-heating systems, the type which is based on water has the drawbacks that water has sometimes to be drawn off, in case water leakage or accidents resulting therefrom take place, thus requiring a great deal of time and work for maintenance; the constituent members are liable to be corroded by water; and room heating is indirectly carried out with a low efficiency because heat exchange is conducted between air and solar heat-holding water.

In contrast, the space heating type of system does indeed have the advantages that it admits of easy maintenance and has a long effective life, but is handicapped in that the plant occupies a large space to attain a desired degree of room heating and moreover involves a complicated arrangement. Therefore, this air type room heating system is not widely applied in practice. For instance, the air type room-heating system proposed by Löff in 1974 which used a single blower comprised four ordinary dampers and two reverse flow stopping dampers to operate the air ducts was of complicated arrangement and became bulky as a whole.

SUMMARY OF THE INVENTION

It is accordingly the object of this invention to provide an air type solar heating system which effectively heats rooms or drys, though the system is of a simple arrangement and does not occupy a considerable amount of space.

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

DETAILED DESCRIPTION OF THE PREFERRED EMBODIMENTS

Figure 1:
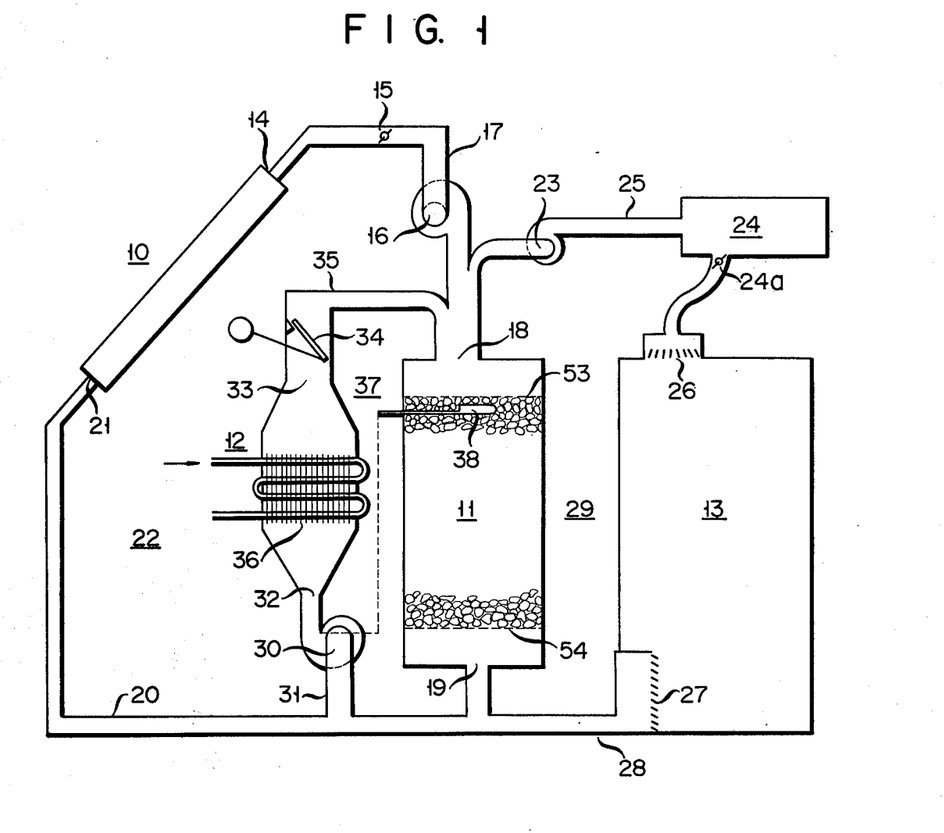
FIG. 1 is a schematic flow diagram of an air type solar heating system embodying this invention.

There will now be described by reference to the appended drawings an air type solar heating system according to one embodiment of this invention. Referring to FIG. 1, the room-heating system comprises a heat collector 10 having the contained air efficiently heated by solar energy; a heat storage apparatus 11 for preserving the heat of hot air; an auxiliary heating device 12 for heating air by other means than solar energy; and a room 13 being heated. An outlet 14 of the heat collector 10 communicates with a first opening 18 of the heat storage apparatus 11 through a first air duct 17 in which a damper 15 and a first blower 16 are provided in the order mentioned. A second opening 19 of the heat storage apparatus 11 is connected to an air inlet 21 of the heat collector 10 through a second air duct 20. The heat collector 10, damper 15, first blower 16 and heat storage apparatus 11 jointly constitute a heat-charging circuit 22. Air heated in the heat collector 10 is carried through the damper 15 to the heat storage apparatus 11. The blower 16 circulates air such that the heated air is stripped of the heat contained therein in said heat storage apparatus 11 and brought back to the heat collector 10.

The first opening 18 of the heat storage apparatus 11 is connected to an air inlet 26 of the room 13 through a heated air feed duct 25 in which a second blower 23 and plenum chamber 24 are provided in the order mentioned. An outlet 27 of the room 13 is connected to the air duct 20 disposed near the second opening 19 of the heat storage apparatus 11 through an air return duct 28. The heat storage apparatus 11, second blower 23, plenum chamber 24 and room 13 collectively constitute a heated air discharge circuit 29. The second blower 23 circulates air such that air heated in the heat storage apparatus 11 passes through the plenum chamber 24 into the room 13 for heating and thereafter drawn off into the air return duct 28.

The second opening 19 of the heat storage apparatus 11 is connected to an inlet 32 of an auxiliary heating device 12 through an auxiliary air duct 31 provided with a third air blower 30. An outlet 33 of the auxiliary heating device 12 is connected to the inlet 18 of the heat storage apparatus 11 through a second air duct 35 provided with a damper 34 which is opened only when the third blower 30 is operated. An auxiliary heating device 12 receives an evaporator 36 of a heat pump. Therefore, the solar heat-utilizing room-heating system of this invention is adapted not only to heat but also to cool the room 13. The auxiliary heating device 12, damper 34, heat storage apparatus 11 and third blower 30 are collectively referred to as an auxiliary heating circuit 37. Referential numeral 38 of FIG. 1 denotes a thermister which operates a prescribed driving circuit to actuate the heating pump and third blower 30 when temperature in the heat storage apparatus 11 falls below a prescribed level.

Figures 2, 4, 5:
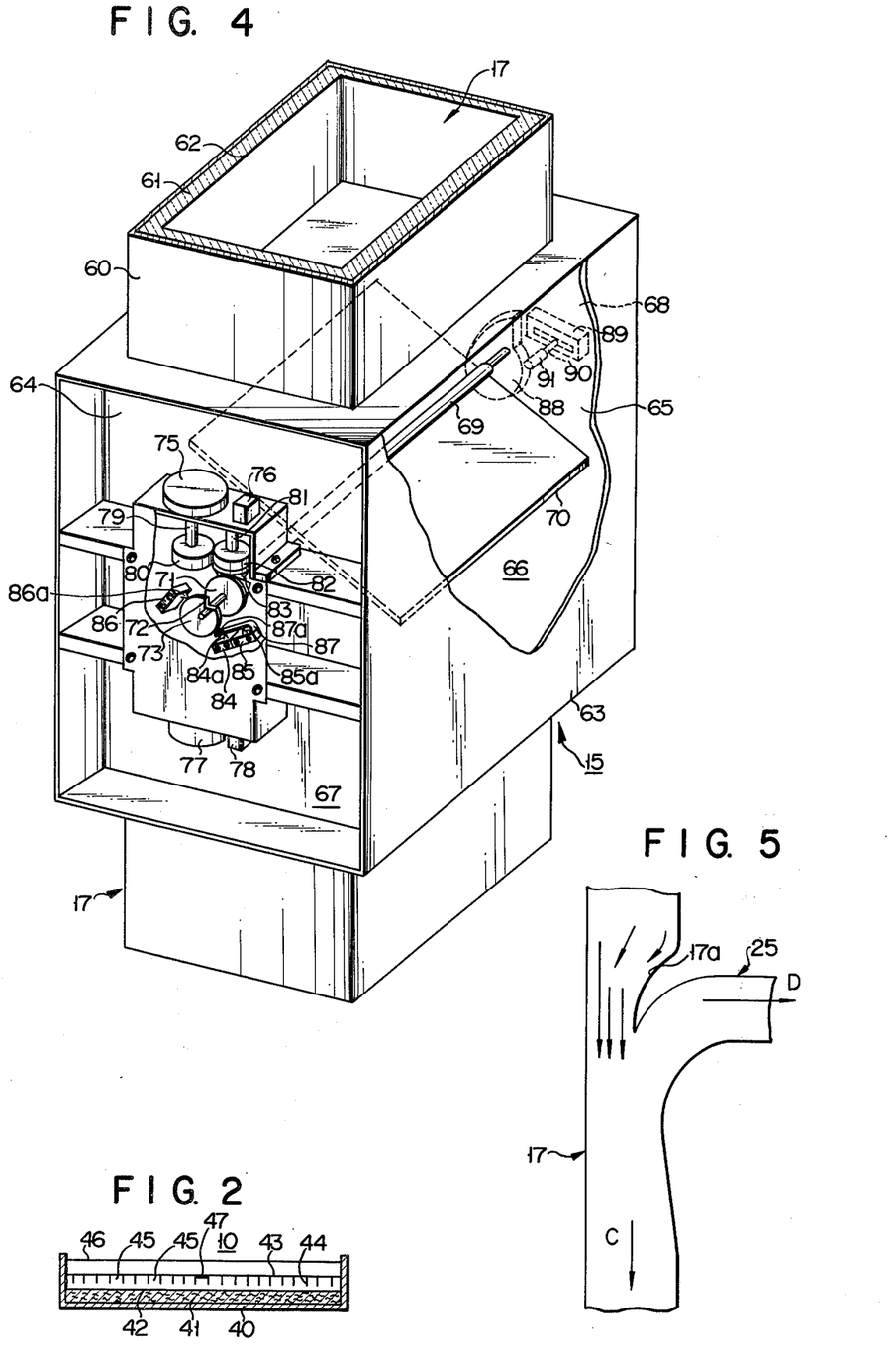
FIG. 2 is a cross-sectional view of a heat collector used with the solar heating system.
FIG. 4 is an oblique view, partly in section, of a damper used with the subject room-heating system.
FIG. 5 is an enlarged cross sectional view of a junction of ducts used with the subject room-heating system.
Figure 3:
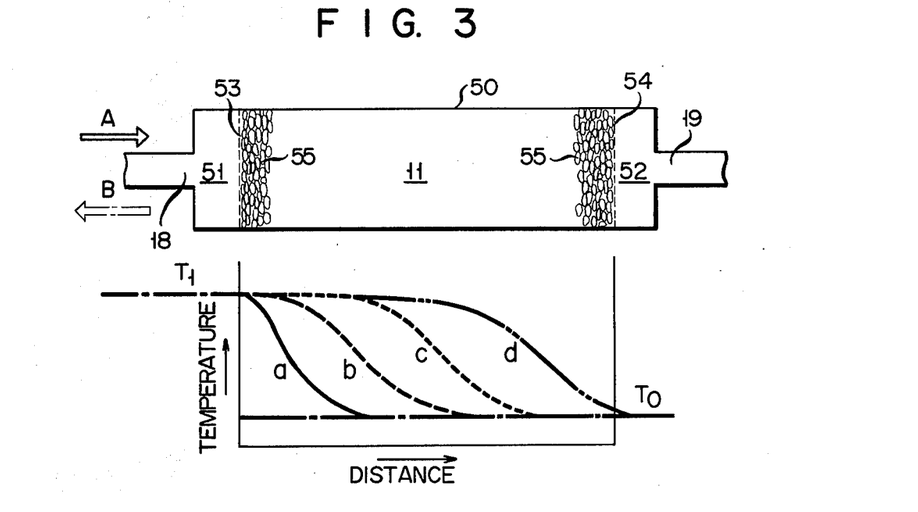
FIG. 3 is a curve diagram indicating the relationship between a heat storage apparatus used with the subject room-heating system and the temperature distribution in the heat storage apparatus.

There will now be described the arrangement and operation of various devices used with the present room heating system. The heat collector 10 is generally set on the roofing or wall of a dwelling so as to be directed to the south. A heat-insulating material 41 such as glass wool is laid all over the underside of a rectangular case 40 open at the top as shown in FIG. 2. The surface of the heat insulating material 41 is covered with an aluminium foil 42. A heat collecting plate 43 made of, for example, copper is positioned above the aluminium foil 42 at a prescribed space. The underside of the heat collecting plate 43 is fitted with a large number of downward projecting fins 44. These fins 44 define numerous air passages 45 between the aluminium foil 42 and heat collecting plate 43. The upper surface of the heat collecting plate 43 is coated with a black heat-absorbing membrane (not shown). A transparent glass or plastics plate 46 is placed on the black heat absorbing membrane. With the heat collector 10 constructed as described above, sunlight passing through the transparent plate 46 is gathered on the heat collecting plate 43 to raise its temperature. Said heat collecting plate 43 heats air flowing thereunder. Referential numeral 47 is a thermister for measuring the temperature of air flowing under said heat collecting plate 43. The heat storage apparatus or holder 11 is disposed in the ground or wall to preserve its heat-insulating property. The heat storage apparatus 11 comprises, as shown in FIG. 3, a cylindrical housing 50; wire nets 53, 54 set near the outlets 18, 19 of the housing 50 respectively with small spaces 51, 52 allowed between said wire nets and outlets; and heat storage material 55 formed of numerous small pebbles for example, 20 to 80 mm in diameter which are filled between both wire nets 53, 54. Provision of the above-mentioned small empty spaces 51, 52 enables air to flow fully through the housing 50 from one of the openings 18, 19 to the other, thereby decreasing a difference between temperature appearing in an area extending along the axis of the housing 50 and temperature occurring in the areas near both lateral sides of said housing 50. Where the heat storage apparatus 11 of the above-mentioned construction is charged with heat by continuously carrying air heated to a given temperature $T_1$ though said one opening 18 in the direction of the indicated arrow A into the heat-storage material 55, the temperature of the air thus introduced progressively changes with time as shown by curves $a \rightarrow b \rightarrow c \rightarrow d$ and finally drops to a level $T_0$ at the other opening 19. After the heat storage apparatus 11 is thus charged with heat, the air at tmeperature $T_0$ runs in the direction of the indicated arrow B into the heat storage material 55 to take off heat contained therein and is drawn off from said one opening 18 in a state heated approximated to a level $T_1$. Where air is continuously circulated under the above-mentioned condition, then the temperature distribution of the heat storage material 55 changes as $d \rightarrow c \rightarrow b \rightarrow a$. Even during this change, outlet air streams from the heat storage apparatus still kept at a temperature level $T_1$ are provided. Where, therefore, heat is released from the heat storage apparatus 11 in which heat is collected at a substantially fixed temperature, then air is circulated in a state heated to a substantially fixed temperature level.

There will now be described by reference to FIG. 4 the arrangement of the damper 15 received in the first air duct 17. A duct 60 defining this air duct 17 is formed of an aluminium foil 62 surrounded with a glass wool layer 61 to effect heat insulation. The damper 15 comprises a damper box 63 disposed at an intermediate point of said duct 60. The interior of the damper box 63 is divided by vertical partitioning walls 64, 65 into a central air flow rate-controlling chamber 66 and both end chambers 67, 68 for receiving the parts of the damper 15. A horizontally extending rotatable shaft 69 penetrates the control part of both partitioning walls 64, 65. The rotatable shaft 69 is fitted at the center with an air flow rate-controlling plate 70 to regulate an amount of air carried through the air flow rate controlling chamber 66 by being inclined upon relation of the rotatable shaft 69.

One end chamber 67 contains a drive mechanism for effecting and normal and reverse rotations of the rotatable shaft 69 and an associated clutch mechanism. A control device for regulating the opening of the air flow rate-controlling plate 70 is received in the other end chamber 68 in such a manner as described below.

That end portion of the rotatable shaft 69 which projects into said one end chamber 67 is concentrically fitted with a bevel gear 71 and a disc cam 73 having a depression 72 formed on the periphery. Bevel gear 71 and cam 73 are received in a chassis 74 fitted to the pertitioning wall 64. The upper part of the chassis 74 is provided with a motor 75 for effecting the right turn of the rotatable shaft 69 and a solenoid 76 constituting an electromagnetic clutch. The lower part of said chassis 74 is fitted with a motor 77 for carrying out the left turn of the rotatable shaft 69 and a solenoid 78 constituting an electromagnetic clutch. A spur gear 80 is horizontally fixed to the lower end of the parpendicularly downward extending rotatable shaft 79 of the first motor 75. A movable shaft 81 extends perpendicularly downward from the solenoid 76 and is fitted to the chassis 74 so as to be rotated and axially moved. The lower end of said movable shaft 81 is concentrically fitted with a spur gear 82 threadedly engaging the aforesaid spur gear 80 and a bevel gear 83 engaging the aforesaid bevel gear 71 when engagement takes place between both spur gears 80, 82. When the movable shaft 81 is lifted, threaded engagement between the spur gears 80, 82 and also between the bevel gears 71, 83 is released. The same gear mechanism as described above is fitted to the perpendicularly upward extending rotatable shaft of the other motor 77 and the perpendicularly upward extending rotatable shaft of the solenoid 78, though said gear mechanism is received in the chassis 74 out of view.

Both motors 75, 77 rotating in the same direction are arranged symmetrically in a vertical direction. Therefore, the shafts of said motors, 75, 77 are turned in opposite directions. Namely, where both motors 75, 77 are of the right turning type, then the lower motor 77 drives the rotatable shaft 69 to the left through the associated spur gear and paired bevel gear. The chassis 74 is provided with three microswitches 84, 85, 86. The projections 84a, 85a of the first and second microswitches 84, 85 used for the opening or closing thereof contact the underside of an elastic movable strip 87, one end of which is supported by the second microswitch 85. The upper surface of the movable strip 87 has a projection 87a which is pressed against the periphery of the disc cam 73 causing the microswitches 84, 85 to be closed. The swingable projection 86a of the third microswitch 86 is spaced 90° from the projection 87a of the movable strip 87 and similarly pressed against the periphery of the disc cam 73. The depression 72 of the disc cam 73 has a smaller degree of opening than 90° in order to prevent the projection 87a of the movable strip 87 and the projection 86a of the third microswitch 86 from being actuated at the same time.

That end of the rotatable shaft 69 which extends into the other end chamber 68 is fitted with an eccentric cam 88. The periphery of cam 88 is contacted by a roller 91 rotatably supported on a slidable element 90 of a slidable resistor 89 fixed on a chassis (not shown).

The first air duct 17 and heated air feed duct 25 are joined as shown in FIG. 5. A throttled portion 17a is formed in the intermediate part of the first air duct 17. The heated air feed duct 25 is connected to said throttled portion 17a so as to define an acute angle to the direction in which heated air flows from the heat collector 10. Said throttled portion 17a is so designed as to cause the first air duct 17 to be gradually widened from said throttled portion 17a. Where, therefore, air is introduced in the direction of the arrows indicated in FIG. 5 by operating the first blower 16, then a negative pressure occurs in the heated air feed duct 25 due to an ejector effect. When, at this time, the second blower 23 is operated, heat is charged in the heat holder 11, in case a large amount of heated air is introduced. Air flows in the direction of the arrow C indicated in FIG. 5. Pressure in one small space of the heat storage apparatus 11 rises by resistance to air flow therein. Negative pressure resulting from an ejector effect and increased pressure caused by resistance to air flow offset each other. Thus, pressure applied to the heated air feed duct 25 does not considerably change with the flow rate of heated air delivered from the heat collector 10, eventually causing heated air to run in the direction of the arrow D shown in FIG. 5.

The foregoing embodiment is provided with a circuit for automatically controlling the damper 15 of FIG. 4. There will now be described by reference to FIGS. 4 and 6 the arrangement and operation of said control circuit.

Figure 6:
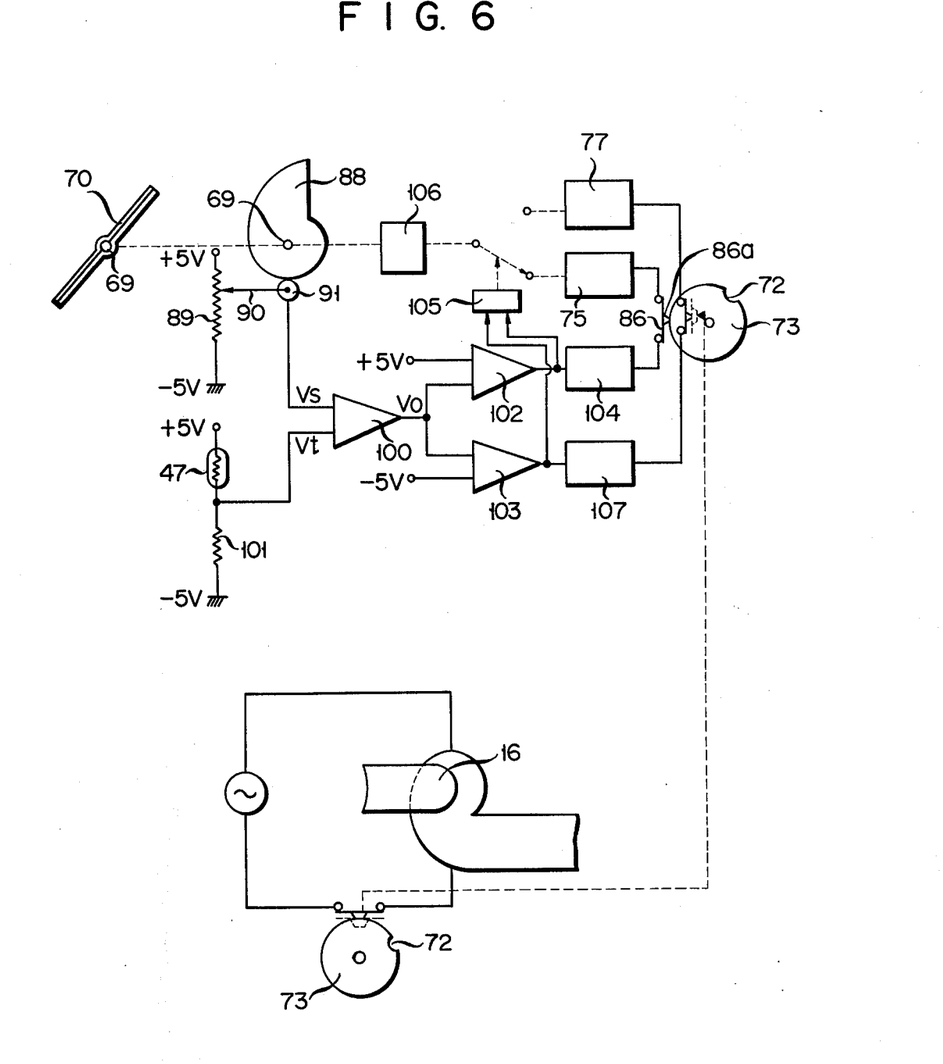
FIG. 6 presents a temperature-controlling circuit used with the subject room-heating system.

Both ends of the slidable resistor 89 are impressed with voltages of +5 and −5 volts. The slidable element 90 is moved by the roller 91 vertically movable by the rotation of the eccentric cam 88, providing a signal voltages Vs corresponding to the inclination of the air flow rate-controlling plate 70. The signal voltage Vs is supplied to one of the input terminals of a differential amplifier 100. The thermistor 47 disposed in the heat collector 10 to detect the temperature of air heated therein is connected in series to a resistor 101. Both ends of a series circuit constituted by said thermistor 47 and resistor 101 are impressed with voltages of +5 and −5 volts. The junction of said thermistor 47 and resistor 101 is connected to the other input terminal of the differential amplifier 100. As the result, the differential amplifier 100 is supplied with voltage Vt which changes with the resistance of the thermistor 47. An output voltage Vo from the differential amplifier 100 which denotes a difference between both voltages Vs, Vt is supplied to one of the input terminals of voltage comparators 102, 103 respectively. The other input terminal of the first voltage comparator 102 is impressed with a prescribed voltage of +5 volts. The other input terminal of the second voltage comparator 103 is impressed with a prescribed voltage of −5 volts. An output voltage Vo from the differential amplifier is compared with said prescribed voltages of +5 and −5 volts. When comparison shows that the output voltage Vo from the differential amplifier 100 is larger than the prescribed voltage of +5 volts impressed on the first voltage comparator 102, then a control signal is generated to trigger a control circuit 104 and clutch control circuit 105. When the motor 75 is rotated as the result, then power supply to the solenoid 76 is stopped, causing the spur gears 80, 82 to be threadedly engaged with the associated bevel gears 80, 82 to respectively. At this time, current flows through the solenoid 78 to release the bevel gear 71 from another bevel gear (not shown). Thus the vertically extending rotatable shaft 79 of the motor 75 and the horizontally disposed rotatable shaft 69 are operatively connected together by means of a speed reduction mechanism 106 comprising spur gears 80, 82 and paired bevel gears 71, 83. Rotation of the horizontally disposed rotatable shaft 69 leads to the right turn of the air flow rate controlling plate 70, disc cam 73 and eccentric cam 88. Later when voltage Vs impressed on one of the input terminals of the differential amplifier 100 changes to cause the output voltage Vo therefrom to present the relationship of +5 > Vo > −5, then a control signal ceases to be supplied from the first voltage comparator 102, stopping the motor 75 and causing the air flow rate controlling plate 70 to be brought to rest at a prescribed angle relative to the horizontal shaft 69. Where the swingable projection 86a of the microswitch 86 is inserted into the depression 72 of the disc cam 73, then said microswitch 86 is rendered nonconducting, even when the output voltage Vo from the differential amplifier 100 is larger than the preset voltage of +5 voltage impressed on the first voltage comparator 102, stopping the rotation of the motor 75. At this time, the air flow rate controlling plate 70 takes a parallel position with air streams. Where change occurs in an amount of sunshine and the temperature of the heat collector 10, then an input voltage Vt supplied to the differential amplifier 100 and in consequence an output voltage Vo therefrom vary. This output voltage Vo from said differential amplifier 100 is conducted to the first and second voltage comparators 102, 103 to be compared with the preset voltages impressed thereon. Where the output voltage Vo is smaller than the preset voltage of −5 volts impressed on the second voltage comparator 103, then a control singal is issued to trigger a control circuit 107 and clutch control circuit 105. When, at this time, the motor 77 is rotated, current passes through the solenoid 78, causing the bevel gear 71 to be threadedly engaged with another bevel gear (not shown), and released from the bevel gear 83. As the result, the rotatable shaft (not shown) of the motor is operatively connected to the horizontally extending rotatable shaft 69, leading to the left turn of the air flow rate controlling plate 70, disc cam 73 and eccentric cam 88. Thus the opening of the first air duct 17 is controlled by the air flow rate-controlling plate 70, causing the flow rate of air carried through the heat collector 10 and in consequence the temperature of the heat collecting plate 43 to be changed.

When input voltage Vt impressed on one of the input terminals of the differential amplifier 100 is changed and an output voltage Vo therefrom presents a relationship of +5 > Vo > −5V, then a control signal ceases to be sent forth from the second voltage comparator 103, stopping the motor 77 and bringing the air flow rate-controlling plate 70 to rest at a prescribed angle relative to the horizontally extending rotatable shaft 69. When the projection 87a of the movable strip 87 is inserted into the depression 72 of the disc cam 73, then the microswitches 84, 85 are rendered nonconducting, even when the output voltage Vo from the differential amplifier 100 is smaller than the preset voltage of −5 volts impressed on the second voltage comparator 103. As the result, the motor 77 and first blower 16 are brought to rest, causing the first air duct 17 to be fully closed by the air flow rate-controlling plate 70.

There will now be summarized by reference to FIG. 1 the operation of a solar heat-utilizing system embodying this invention. When, upon receipt of sunlight, the heat collecting plate 43 of the heat collector 10 has its temperature raised, then the damper 15 is automatically opened, and the first blower 16 is driven to circulate air through the heat-charging circuit 22. Air heated in the heat collector 10 passes through the first air duct 17 into the heat storage apparatus 11. Heat exchange takes places between the heated air and the heat storage material 55 contained in said heat storage apparatus 11. The air now cooled is returned to the heat collector 10 through the second air duct 20. Further, when the second blower 23 is operated, part of the heated air running through the first air duct 17 flows into the heated air feed duct 25 instead of being carried into the heat storage apparatus 11. The heated air whose pressure has been stabilized in the plenum chanber 24 enters the room 13 through the inlet 26 for heating. The air which is cooled by release of heat is brought back to the second air duct 20 through the outlet 27 of the room 13. In the second air duct 20 the air discharged from the room 13 converges with the cooled air taken out of the storage apparatus 11. The air mixture is carried through said second air duct 20 back to the heat collector 10.

Where room heating is to be carried out when sunlight is shut off by clouds or a sufficient amount of sunlight is not obtained, for example, at sunset, then the first blower 16 is stopped and the damper 15 is closed. At this time, the second blower 23 continues to be operated, causing air heated in the heat storage apparatus 11 to be conducted through the first opening 18, heated air feed duct 25 and plenum chamber 24 into the room 13 for heating. The air which has released heat in the room 13 passes through the outlet 27 and enters the heat storage apparatus 11 through the second opening 19 to be heated again.

What calls for notice in the above-mentioned operation is that when the storage apparatus 11 is charged with heat, air enters said heat storage apparatus 11 at the first opening 18 and is discharged therefrom at the second opening 19, whereas, when heat is discharged from the heat storage apparatus 11, air is brought into said heat storage apparatus 11 at the second opening 19 and drawn off therefrom at the first opening 18. The reason is that it is intended, as described by reference to FIG. 3, to provide air heated to a constant level of temperature.

Where, with an air type solar heating system according to the foregoing embodiment, an amount of heat accumulated in the heat storage apparatus 11 falls from a prescribed level, then the thermistor 38 detects this event and operates a heat pump and third blower 30 to deliver heat from the auxiliary heating device 12 to the room 13 for heating.

Where the damper 24a is throttled to restrict an amount of heated air carried into the room 13 while air heated by the auxiliary heating device 12 is being brought into the room 13, then part of the heated air flows through the heat storage apparatus 11. Therefore, heat accumulation and room heating can be easily controlled simply by regulating the extent to which the damper 24a is throttled.

An auxiliary heat source such as a heat pump can not have its heat generation freely controlled. Where a dwelling has a plurality of rooms which have to be heated by solar heat with the aid of, if necessary, of the above-mentioned type of auxiliary heat source, it is sometimes desired to carry out room heating in various forms, for example, to heat only one or two rooms or all the rooms equally. Where said auxiliary heat source is applied as an aid in heating only one room and happens to generate a larger amount of heat than required, the excess heat is accumulated in the heat storage apparatus 11. When the temperature of the heat storage apparatus 11 is increased due to accumulation of heat to a sufficiently high level to cause the thermister 38 to be put into operation, then the auxiliary heat source is stopped, and room heating is effected by heat released only from the heat holder 11. Therefore, the solar heating system of this invention can control heat generation from the auxiliary heat source.

The above-mentioned function of the present solar heating system is also applicable in room cooling. Namely, where one, two or all required rooms are cooled by a room cooler whose capacity cannot be varied and excess decreased heat arises even after control by a damper, then said excess decreased heat is stored in the heat storage apparatus 11 as in the case of room heating. Further, the solar heat utilizing system of this invention can act as a room cooler by application of inexpensive midnight dump power.

Figure 7:
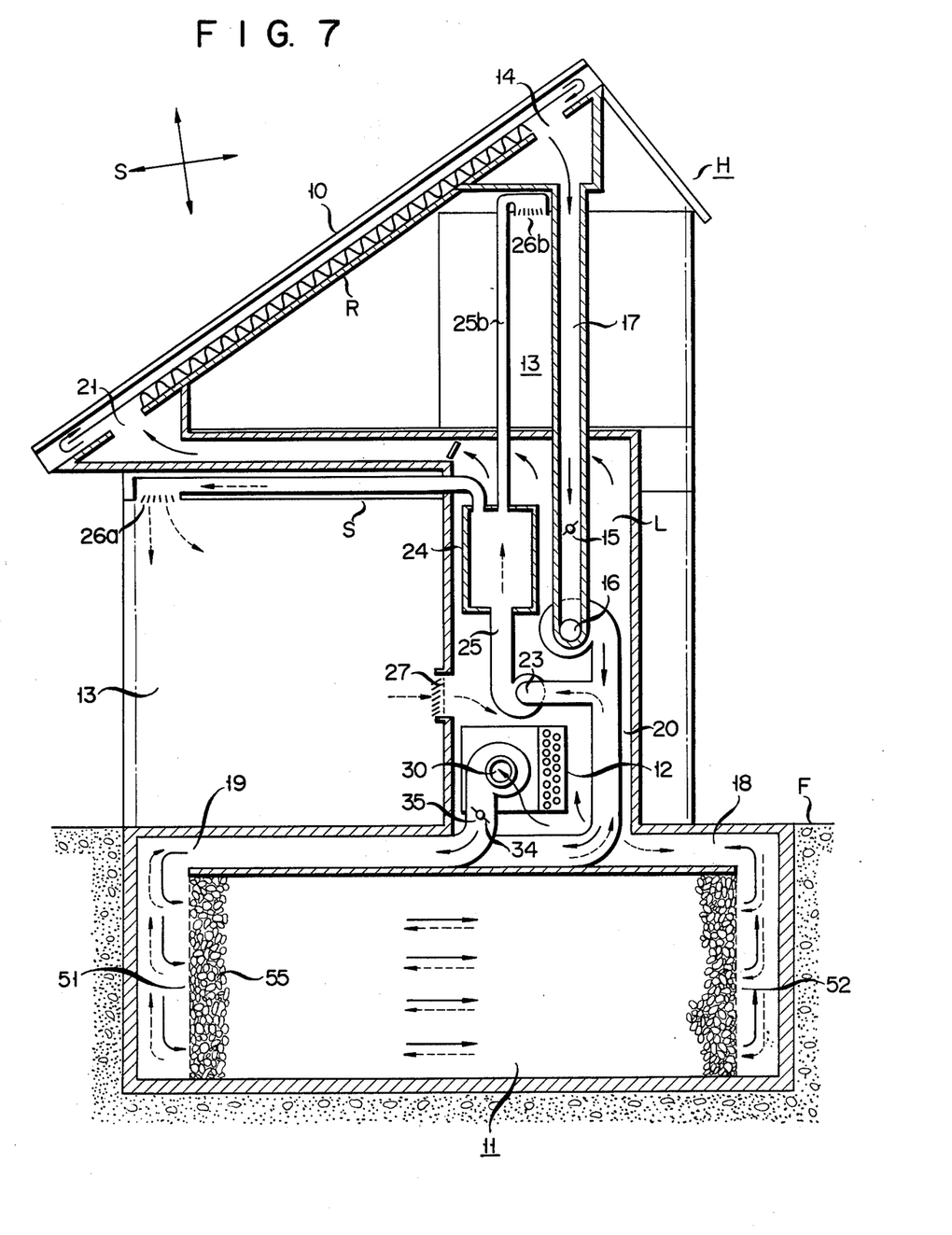
FIG. 7 is a cross-sectional view of a dwelling in which the subject room heating system of FIG. 1 is actually installed.

FIG. 7 illustrates a two-storied dwelling provided with the solar heating system of FIG. 1. The parts of FIG. 7 correspond to those of FIG. 1 and are denoted by the same numerals, description thereof being omitted.

A heat collector 10 is fitted to the south-directed plane of roofing R of a two-story dwelling H. A heat storage apparatus 11 is horizontally set under a ground floor F. A heating plant chamber L positioned between the ceiling S of a first-storey or a second-storey room and the underside of the ground floor contains first to third blowers 16, 23, 30, auxiliary heat source 12 and plenum chamber 24.

The heating plant chamber L comprises an air return duct 27 for carrying cooled air from the room 13 and heat storage apparatus 11 to the heat collector 10 and second air duct 20. The heating plant chamber L also contains a heated air feed duct 25 for conducting hot air from the heat collector 10 or heat storage apparatus 11 to the room 13 and part of the first air duct 17 for carrying hot air from the heat collector 10 to the heat storage apparatus 11.

Figure 8:
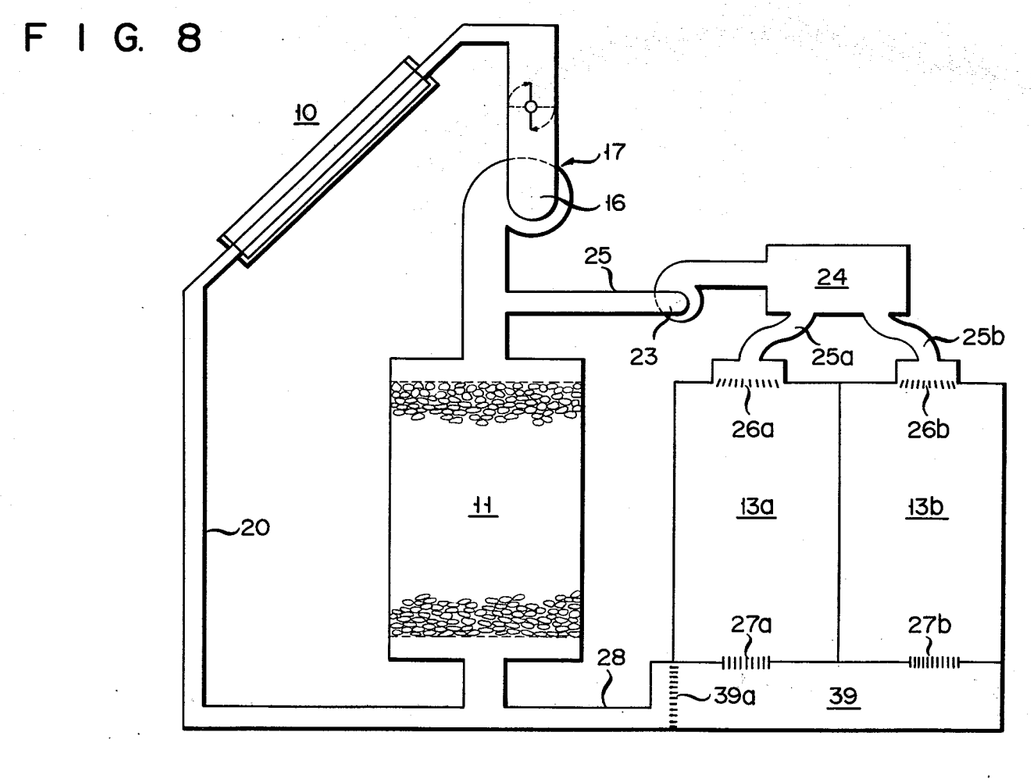
FIG. 8 is a schematic flow diagram of a modification of the subject room heating-system.

The solar heating system of FIG. 7, has the advantages that a duct system for conducting hot air heated in the heat collector 10 reaches the room 13 or heat storage apparatus 11 after passing through relatively hot air discharged from the room 13 and heat storage apparatus 11, consequently occupies a small area, and is subject to little heat loss; air ducts and other devices which are not exposed to the outside desirably require a small space from the standpoint of rendering a dwelling attractive as a whole and are gathered in one place to admit of easy maintenance; the relatively large heating plant chamber L which is made concurrently to act as a low temperature air duct decreases resistance to air flow in said duct, making it possible to apply small capacity blowers 26, 27, 28; and the heating plant chamber L has substantially the same interior pressure as the room 13, regardless of the flow rate of air running through said chamber L, thereby decreasing the leakage of heated air.

Where two or more rooms are heated by the solar heating system of this invention shown in FIG. 7, then the arrangement of FIG. 8 offers convenience.

Referring to FIG. 8, that portion of the heated air feed duct 25 which lies between the common plenum chamber 24 and rooms 13a, 13b is separated into two branches 25a, 25b. Heated air is conducted from said branches 25a, 25b into the rooms 13a, 13b through the associated inlets 26a, 26b. The rooms 13a, 13b are provided with outlets 27a, 27b respectively. These outlets 27a, 27b directly communicate with another common plenum chamber 39. The outlet 39a of said plenum chamber 39 is connected to an air return duct 28. If the common plenum chamber 39 is disposed in an empty space of a dwelling such as a corrider thereof, then the corrider itself can also be heated to some extent. Where a plurality of rooms are heated, it is obviously possible to connect the outlets of the respective rooms directly to the air return duct 28 instead of providing the common plenum chamber 39.

The above-mentioned air type solar heating system of this invention is of a considerably simple arrangement and has its occupying space prominently reduced without decreasing heat efficiency. Further, the present solar heating system need not be provided with an auxiliary heating device in this case, it is advised to apply three blowers. A first blower used with a heat-charging circuit generally consumes a larger amount of power. However, this first blower is driven only during sunshine and in winter time for a period of the 9th to the 15th hour of a day namely, 6 hours per day. A second blower used with a heat-releasing circuit is generally operated from the 7th to the 22nd hour of a 24 hour time period every day. Therefore, the solar heating system of this invention in which the first large capacity blower and the second smaller capacity blower are separately provided is more economical than the type in which a single large capacity blower is used throughout the year and moreover offers the advantage of minimizing noises even during night time operation.

With all the foregoing embodiments, the first blower used with the heat-charging circuit and damper were provided in the first air duct. But instead, it is possible to set said first blower and damper in the second air duct or install them separately in the first and second air ducts.

Obviously numerous modifications and variations of the present invention are possible in light of the above teachings. It is therefore to be understood; that within the scope of the appended claims, the invention may be practiced otherwise than as specifically described herein.

What we claim is:

1. An air type heating system comprising a heat-charging circuit including a heat storage apparatus provided with first and second air openings between which air flows, a heat collector connected between the air openings of the heat storage appartus to heat air streams running through said collector by solar energy, a first blower connected between said heat collector and said first air opening for circulating air streams through the heat storage apparatus in a first direction from the first air opening to the second air opening of the heat storage appartus, and an air flow rate-controlling device connected between said heat collector and said first air opening for regulating an amount of air thus circulated, said heat storage apparatus containing heat-storage material for absorbing heat from the air heated by the heat collector and progressively accumulating heat, starting with the first air opening; and a heat discharging circuit including a heated chamber connected to the first and second air openings of the heat storage apparatus, and a second blower connected to the first air opening for circulating air through the heat storage apparatus in a direction opposite the first direction from the second air opening to the first air opening of the heat storage apparatus, heating air by the heat accumulated in the heat storage material, and conducting the heated air through said first air opening to the chamber of a dwelling being heated.

2. The solar heating system according to claim 1, wherein the heat storage apparatus comprises a housing whose opposite ends are provided with the first and second air openings, and the heat storage mateial is formed of a large number of small pebbles packed in the housing.

3. The solar heating system according to claim 1, wherein the heat storage apparatus comprises a pair of nets disposed near the first and second air openings of the housing to define first and second empty spaces, and a large number of pebbles are packed between the two nets.

4. The solar heating system according to claim 1, which further comprises an auxiliary heating device connected between the first and second air openings of the heat storage apparatus, and a third blower for conducting air heated by said auxiliary heating device to the chamber being heated and the heat storage apparatus.

5. The solar heating system according to claim 4, wherein the auxiliary heating device further includes a cooling mechanism.

6. The solar heating system according to claim 4, which further comprises means for detecting the temperature of the heat storage apparatus and operating the third blower and auxiliary heating device, when said temeperature falls below a prescribed level.

7. The solar heating system according to claim 6, wherein said means for detecting the temperature of the heat storage apparatus comprises a thermister disposed in the heat storage apparatus.

8. The solar heating system according to claim 2, wherein the heat-charging circuit comprises a first air duct which connects the heat collector and the first air opening of the heat storage apparatus and includes an air flow rate-controlling means and first blower interconnecting the heat collector and the first air opening of the heat storage apparatus and a second air duct which connects the second air opening of the heat storage apparatus and heat collector wherein the heat-discharging circuit comprises a heated air feed duct which connects the first air duct and the room being heated, and an air return duct connecting the chamber being heated and second air duct.

9. The solar heating system according to claim 8, wherein a portion of the first air duct, which faces the heat collector and is disposed near a point at which the heated air feed duct is connected to said first air duct, is bored with an orifice, and said heated air feed duct has a portion connected to the outlet side of said orifice at an acute angle to air streams running through said outlet.

10. The solar heating system according to claim 8, wherein part of either of the first air duct and heated air feed duct passes through part of the air return duct and second air duct.

11. The solar heating system according to claim 2, wherein the heat collector comprises a case, a heat insulating material laid on the inner bottom part of said case, a heat collecting plate provided above said heat insulating material, a plurality of downwardly projecting fin members fitted to the underside of said heat insulation plate so as to define a plurality of air passages, and a transparent sunlight collecting plate mounted on the heat collecting plate.

12. The solar heating system according to claim 2, which further comprises a control device for detecting the temperature of hot air in the heat collector, and operating the air flow rate-regulating means according to the detected temperature thereby adjusting an amount of air running through said regulating means.

* * * * *